June 5, 1934.  H. E. SANFORD  1,961,171
CAGE PERCH
Filed Sept. 26, 1932
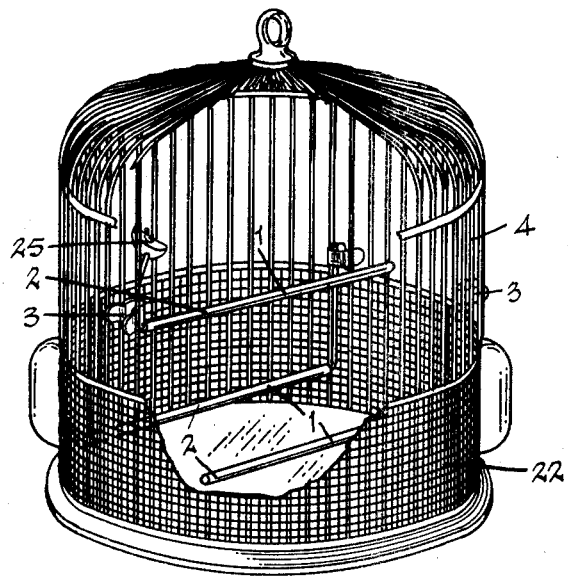
Fig 1
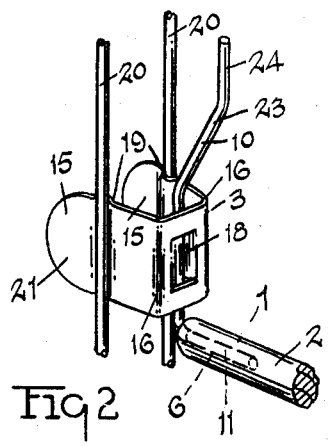
Fig 2
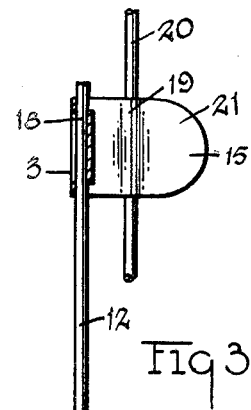
Fig 3
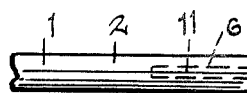
Inventor
Harry E. Sanford
By Faust F. Crampton
Attorney Patented June 5, 1934

1,961,171

UNITED STATES PATENT OFFICE 1,961,171

CAGE PERCH

Harry E. Sanford, Toledo, Ohio

Application September 26, 1932, Serial No. 634,847

2 Claims. (Cl. 119—26)

My invention relates to perches or roosts for caged animals and fowl, and more particularly to roosts or perches for small caged animals and fowl whose native habitat is principally in the limbs of trees and shrubs wherein they move from limb to limb in search of food and for the sake of exercise during their natural life.

The invention has for its object to provide a roost or perch having means whereby simulation of the resiliency and flexibility of the limbs and twigs of the trees of the native habitat of the caged animal or fowl is obtained and thereby provides a means whereby the animal or fowl is maintained in a healthy muscular state conducive to longer life and increased efficiency as a pet or in performance of services useful to man.

Another object of the invention is to provide a roost or perch, of the character described above, having means whereby the perch may be withdrawn from the cage for purposes of cleaning and repair and reinserted within the cage without placing the hand within the confines thereof and thereby providing a perch which may be handled with reference to the cage without danger of bruising or crushing the bodies of the animals or fowl within the cage or escape thereof from the cage.

A still further object of the invention is to provide means associated with perch for supporting portions of food within the cage whereby the animal or fowl standing on the roost may easily reach and feed upon the food particles.

The invention has for a further object to provide a roost or perch of small cost and pleasing appearance partaking of the features heretofore described.

The invention consists in other features and advantages which will appear from the following description and upon examination of the drawing. Structures containing the invention may partake of different forms and may be varied in their details and still embody the invention. To illustrate a practical application of the invention I have selected a perch embodying the invention as an example of the various structures and details thereof that contain the invention and shall describe the selected structure hereinafter, it being understood that variations may be made without departing from the spirit of the invention. The particular structure selected is shown in the accompanying drawing.

Fig. 1 of the drawing illustrates a perspective view of a cage showing the selected forms of perch installed therein. Fig. 2 illustrates an enlarged broken view of one of the perches shown in Fig. 1. Fig. 3 illustrates an enlarged broken view of a modified form of the perch shown in Fig. 2.

The perch or roost provided by my invention has a cross-bar which is supported at one end by a flexible member. Thus, when the animal or bird jumps or moves onto the perch there will be slight definite spring vibratory movements of the cross-bar which gradually absorbs the shock of the body impact in the jumping, much after the fashion of a tree sprig or branch. My invention also provides a gripping member which may be operated exterior of the cage for holding the perch in position within the cage, and whereby the perch may be easily withdrawn for cleaning purposes and the like.

The particular construction chosen for purposes of illustration and shown in the drawing is especially designed for small birds. The perch 1 is formed of a cross-bar 2 and a supporting means 3. The cross-bar 2 may be formed of wood and is preferably in spindle form to permit clasping thereof by the claws of the bird which may be confined within the cage 4. One end of the cross-bar is preferably free and rounded so as not to present sharp edges such as would tend to bruise or wound the bird's body as it moved about the cage. The other end of the cross-bar 2 is provided with an opening or end socket 6 which extends from the ends of the cross-bar inwardly along substantially the central axis of the cross-bar. The socket 6 is adapted to receive a portion of the supporting means 3.

The supporting means 3 is formed preferably of light gauge wire 10 treated so as to prevent rust thereof. The wire 10 is bent L-shaped to have a short leg 11 and a long leg 12. The leg 11 is adapted to be inserted within the socket 6 and forms a resilient interconnection therewith which permits slight angular or vibratory movements of the cross-bar 2 with reference to the leg 12 of supporting means.

The leg 12 is provided with a pair of wings 15 which are bent, as at 16, to form a substantially U-shaped member. The leg 12 is preferably connected to the wings 15 at a point substantially central of the web of the U-shaped form and may be fixed thereto as by soldering or in the manner illustrated at 18. Thus, the leg 12 will be held as against movement with reference to the wings 15.

The bent portions 16 of the wings 15 are provided with grooves 19 which extend from the outer surfaces thereof inwardly and toward one another. The grooves 19 are substantially of the same dimension as the circumference of the bars 20 of the cage 4 and thus each is adapted to receive a bar 20 therein. The ends of the bent portions 16 are flared, as at 21, and provide convenient finger holds for locating the supporting means with reference to the cage.

Thus it will be seen when it is desired to install the perch within the cage 4, the flared portions 21 are gripped between the fingers pressing the wings 15 toward one another and the cross-bar 2 is directed between the bars 20. The grooves 19 of the wings 15 are then brought into alignment with the bars 20 and the wings 15 released, the bias of the bent portions 16 exerting a constant spring pressure on the bars 20 to hold the cross-bar in a fixed location within the cage 4 until later released for purposes of withdrawal or relocation.

The form of construction shown in Fig. 2 is designed preferably for the upper perches, while the construction, shown in Fig. 3, is designed for the lower perches in the cage 4 which is provided with a guard screen 22 which extends a short distance up the wall of the cage 4. Therefore, the form of construction shown in Fig. 3 has a relatively longer leg 12 to permit the location of the cross-bar 2 below the upper edge of the guard 22.

If desired, the upper end of the leg 12 may be bent, as at 23, to form a food support 24 whereby such materials, as a portion of an apple 25, may be stuck thereon and supported in a convenient easily reached spot with reference to the perch.

I claim:

1. In a cage perch, a cross-bar, one end of the cross-bar having a socket extending along the central axis of the cross-bar, an L-shaped wire bracket, one leg of the L-shaped wire bracket being adapted to be located within the socket, and a U-shaped sheet metal member connected to the other of the legs of the L-shaped member, the legs of the U-shaped member having grooves adapted to receive and frictionally grip portions of the cage, and the end of the second named leg of the L-shaped member being bent to form a support for food.

2. In a cage perch, a cross-bar, a socket formed in an end of the cross-bar, a substantially L-shaped bracket, one leg of the L-shaped bracket being adapted to be received in the said socket, and a substantially U-shaped sheet metal member, the web of the U-shaped sheet metal member having parallel slits for receiving the other leg of the L-shaped bracket, the legs of the U-shaped member having grooves adapted to receive and frictionally grip portions of the cage, and the said legs of the U-shaped member extending at substantially right-angles to and well beyond the walls of the cage forming convenient perch manipulating and removing means.

HARRY E. SANFORD.